United States Patent
Chen et al.

(10) Patent No.: US 12,237,464 B2
(45) Date of Patent: Feb. 25, 2025

(54) PREPARATION METHOD AND APPLICATION OF TITANIUM NITRIDE FIBER-ENHANCED QUASI-SOLID-STATE ELECTROLYTE

(71) Applicant: Harbin University of Science and Technology, Harbin (CN)

(72) Inventors: Zhen Chen, Harbin (CN); Yixin Wu, Harbin (CN); Minghua Chen, Harbin (CN)

(73) Assignee: Harbin University of Science and Technology, Harbin (CN)

( * ) Notice: Subject to any disclaimer, the term of this patent is extended or adjusted under 35 U.S.C. 154(b) by 0 days.

(21) Appl. No.: 18/781,399

(22) Filed: Jul. 23, 2024

(65) Prior Publication Data
US 2025/0038251 A1   Jan. 30, 2025

(30) Foreign Application Priority Data
Jul. 25, 2023 (CN) .......................... 202310918815.7

(51) Int. Cl.
| | |
|---|---|
| H01M 10/05 | (2010.01) |
| C01B 21/076 | (2006.01) |
| C08J 3/205 | (2006.01) |
| C08K 5/43 | (2006.01) |
| C08K 7/04 | (2006.01) |
| D01F 9/08 | (2006.01) |
| D01F 11/00 | (2006.01) |
| D04H 1/4209 | (2012.01) |
| D04H 1/4282 | (2012.01) |
| D04H 1/728 | (2012.01) |
| D06C 7/00 | (2006.01) |
| H01M 10/0525 | (2010.01) |
| H01M 10/056 | (2010.01) |

(52) U.S. Cl.
CPC ....... *H01M 10/056* (2013.01); *C01B 21/0761* (2013.01); *C01B 21/0768* (2013.01); *C08J 3/2053* (2013.01); *C08K 5/43* (2013.01); *C08K 7/04* (2013.01); *D01F 9/08* (2013.01); *D01F 11/00* (2013.01); *D04H 1/4209* (2013.01); *D04H 1/4282* (2013.01); *D04H 1/728* (2013.01); *D06C 7/00* (2013.01); *H01M 10/0525* (2013.01); *C08J 2327/18* (2013.01); *C08J 2327/20* (2013.01); *C08K 2201/001* (2013.01); *D10B 2101/14* (2013.01); *D10B 2505/00* (2013.01); *H01M 2300/0017* (2013.01); *H01M 2300/0085* (2013.01)

(58) Field of Classification Search
CPC ........... H01M 10/056; H01M 10/0561; H01M 10/0564; H01M 10/0525; H01M 10/052; H01M 2300/0017; H01M 2300/0085; C01B 21/0761; C01B 21/0768; C08J 3/2053; C08J 2327/18; C08J 2327/20; C08K 5/43; C08K 7/04; C08K 2201/001; D01F 9/08; D01F 11/00; D04H 1/4209; D04H 1/4282; D04H 1/728; D06C 7/00; D10B 2101/14; D10B 2505/00
See application file for complete search history.

(56) References Cited

U.S. PATENT DOCUMENTS

| | | | |
|---|---|---|---|
| 2019/0157650 A1* | 5/2019 | Oura | .................... H01M 50/536 |
| 2020/0136113 A1 | 4/2020 | Kumta et al. | |
| 2022/0052374 A1* | 2/2022 | Maurano | ................. H01M 4/58 |
| 2023/0009782 A1* | 1/2023 | Kuriki | ............... H01M 10/0585 |

FOREIGN PATENT DOCUMENTS

| | | |
|---|---|---|
| CN | 101869842 A | 10/2010 |
| CN | 106299467 A | 1/2017 |
| CN | 110994017 A | 4/2020 |
| CN | 111816918 A | 10/2020 |
| CN | 115425283 A | 12/2022 |
| CN | 115954433 A | 4/2023 |
| KR | 20090012595 A | 2/2009 |
| KR | 20170004236 A | 1/2017 |

OTHER PUBLICATIONS

Yang Wang et al. "PVDF-HFP/PAN/PDA@LLZTO Composite Solid Electrolyte Enabling Reinforced Safety and Outstanding Low-Temperature Performance for Quasi-Solid-State Lithium Metal Batteries", ACS Applied Materials & Interfaces, May 3, 2023.

* cited by examiner

*Primary Examiner* — Raymond Alejandro

(57) ABSTRACT

A preparation method and application of a titanium nitride fiber-enhanced quasi-solid-state electrolyte, which relates to a synthetic method and application of a solid-state electrolyte. The object of the present disclosure is to solve the problem that the existing polymer electrolyte has low ionic conductivity, poor lithium ion transference number, and insufficient inhibition of lithium dendrite growth. The method includes the following steps: 1. preparation of TiN nanofiber, and 2. preparation of electrolyte. The TiN nanofiber-enhanced electrolyte is used as a solid-state electrolyte of lithium ion batteries. The electrolyte material provided by the present disclosure has excellent rate performance, high cycle stability, and long-term cycle life. In the present disclosure, a TiN nanofiber-enhanced quasi-solid-state electrolyte can be obtained.

4 Claims, 11 Drawing Sheets

PREPARATION METHOD AND APPLICATION OF TITANIUM NITRIDE FIBER-ENHANCED QUASI-SOLID-STATE ELECTROLYTE

CROSS-REFERENCE TO RELATED APPLICATION

This application claims priority from the Chinese patent application 2023109188157 filed Jul. 25, 2024, the content of which is incorporated herein in the entirety by reference.

TECHNICAL FIELD

The present disclosure relates to a preparation method and application of a solid-state electrolyte.

BACKGROUND

Persistent pursuit for clean and renewable energy has been an important topic in human development. The lithium-ion batteries (LIBs) have been one of the key research objects in various electrochemical power supplies since their commercialization in the 1990s and also have been widely applied in industry and daily life. Nevertheless, the energy density of the electrode material (especially graphite) of the state-of-the-art LIBs is already close to the physical extreme, failing to satisfy the continuously increasing requirements of energy storage at present. The lithium metal has an extremely high theoretical specific capacity (3860 mAh g$^{-1}$, which is 10 times that of the graphite) and an extremely low redox potential (−3.04 V vs. standard hydrogen electrode), which is recognized as a competitive anode material of next generation of high specific-energy batteries. The lithium metal battery (LMB), the lithium-sulfur battery, the lithium-air battery, and the solid-state lithium oxide battery which use the metal lithium as anode have an extremely high theoretical energy density, and are expected to solve the "range anxiety" of the portable electronic devices and the electric vehicles, attracting many researchers' attention. However, in the traditional LIBs, the lithium metal anode cannot be used, because it is extremely easy to generate a branched morphology structure called lithium dendrite during the charge and discharge process on the surface of the metal. The formation and growth of the lithium dendrite reduces the utilization rate of the active material, leading to capacity attenuation and shorter cycle life of batteries. The liquid electrolyte and the separator cannot inhibit the penetration of lithium dendrite, and then causing the battery to short-circuit, leading to potential safety hazards such as severe thermal runaway and even explosion, bringing huge potential safety hazards and severely hindering the practical application of the lithium metal anode.

Many strategies have been provided to inhibit the dendrite growth and stabilize the solid electrolyte interphase (SEI), such as the introduction of electrolyte additive, use of solid-state electrolyte, modification of separator, design of lithium metal structure, and so on. In these trials, the solid-state electrolyte (SSE) has drawn increasing attention due to its capability to effectively block the growth and penetration of the lithium dendrite. Compared with the inorganic solid-state electrolyte, the polymer electrolyte has excellent flexibility and great processability. The interface contact between electrolyte and electrode can be further enhanced by utilizing a solid-liquid mixed electrolyte system, thus declining the interface impedance and improving the performance of batteries. At present, polymer materials such as polyethylene oxide (PEO), polyacrylonitrile (PAN), poly(vinylidene fluoride) (PVDF), and poly(vinylidene fluoride-hexafluoropropylene) (PVDF-HFP) have been widely applied as substrates of the polymer electrolytes. Among them, PVDF-HFP has the advantages of high dielectric constant, good stability, strong heat resistance, and high mechanical strength, which can be used as a flexible polymer substrate to manufacture a reliable polymer electrolyte and construct a high-performance and high-safety lithium metal battery. However, limited by the property of the polymer material, the polymer electrolyte has a high degree of crystallization at room temperature and a weak ability to disassociate lithium salt. Therefore, its ionic conductivity and lithium ion transference number are relatively low at room temperature, unable to satisfy the requirements of the solid-state lithium metal battery. Furthermore, the problem of lithium dendrite growth has not been completely solved, and the dendrite can still form and penetrate the electrolyte, leading to short-circuiting. Therefore, the performance of the pure polymer electrolyte still cannot satisfy the requirements of the solid-state lithium metal battery.

SUMMARY

In order to solve the problems of low ionic conductivity, poor lithium ion transference number, and insufficient inhibition on lithium dendrite in polymer electrolytes, the present disclosure provides a preparation method and application of a titanium nitride (TiN) nanofiber-enhanced quasi-solid-state polymer electrolyte (QPE).

There is a preparation method for a TiN nanofiber-enhanced QPE, which is carried out by the following steps:

I. Preparation of TiN Nanofiber:
  ① Adding, stirring, and dissolving polyvinylpyrrolidone in a mixed solution of anhydrous ethanol and glacial acetic acid, and then adding tetrabutyl titanate and continuing stirring to form a uniform solution as the electrospinning precursor solution;
  ② Loading the electrospinning precursor solution into a syringe and then mounting the syringe inside an electrospinning machine. Then, the fiber felt was obtained by electrospinning method;
  ③ Heating the fiber felt to a calcination temperature in an air atmosphere and then calcining at the calcination temperature to obtain TiO$_2$ nanofiber;
  ④ Placing the TiO$_2$ nanofiber into a tube furnace and then introducing a mixed gas of NH$_3$ and Ar into the tube furnace. Heating the tube furnace to the calcination temperature to obtain TiN nanofiber;

II. Preparation of Electrolytes:
  ① Adding the TiN nanofiber to N, N-dimethylformamide for ultrasonic treatment. Then, add PVDF-HFP and LiTFSI and magnetically stirring to obtain a casting solution;
  ② Performing vacuum defoaming on the casting solution and then casting the solution on a glass plate with a doctor blade, and finally drying to obtain the TiN nanofiber-enhanced QPE.

The TiN nanofiber-enhanced QPE is used as a solid-state electrolyte of a lithium ion battery.

The principle of the present disclosure is described below:

The present disclosure provides a preparation method and application of a TiN nanofiber-enhanced QPE. In the present disclosure, a TiN filler with nanosized and fibrous morphology is obtained by electrospinning and high-temperature calcination. The electrolyte film with a uniform structure is prepared by casting method; the TiN nanofiber has high mechanical strength and specific surface area, which increases interaction between the filler and the polymer substrate. Therefore, it can be easily dispersed uniformly in the substrate, avoiding agglomeration and significantly improving the electrochemical performances of the electrolyte.

The advantages of the present disclosure are described below:

In the present disclosure, the PVDF-HFP-based QPE and the TiN nanofiber-enhanced QPE are tested for electrochemical performances, which shows that the ionic conductivity of the PVDF-HFP-based QPE is significantly increased from 0.14 mS cm$^{-1}$ to 0.82 mS cm$^{-1}$, the lithium ion transference number is increased from 0.24 to 0.39, and the oxidation potential is 4.7 V; the Li|QPE|LiFePO$_4$ full battery assembled with the TiN nanofiber-enhanced QPE has a specific discharge capacity of 164 mAh g$^{-1}$ at 0.1 C and still has a specific capacity of 105 mAh g$^{-1}$ at 5 C, which means that the electrolyte material provided by the present disclosure has excellent rate capability. In the present disclosure, the service life of the Li||LiFePO$_4$ full battery assembled with the TiN nanofiber-enhanced QPE is tested, which shows that it has a capacity retention rate of more than 95% after completing 100 cycles at 1 C, which means the QPE provided by the present disclosure has high cycle stability and long-term cycle life.

BRIEF DESCRIPTIONS OF THE DRAWINGS

FIGS. 1A-C are SEM images and an XRD pattern of TiN nanofiber prepared in embodiment 1 under different magnification factors, where FIG. 1A and FIG. 1B are SEM images and FIG. 1C is the XRD pattern.

FIGS. 2A-F are surface SEM images, cross-sectional SEM images, and optical photographs of the un-doped PVDF-HFP-based QPE and the TiN nanofiber-enhanced QPE prepared in a control embodiment 1, where FIGS. 2A-C are the surface SEM image, cross-sectional SEM image, and an optical photograph of the un-doped PVDF-HFP-based QPE, respectively. And FIGS. 2D-F are the surface SEM image, cross-sectional SEM image, and optical photograph of the TiN nanofiber-enhanced QPE, respectively.

Figure 6:
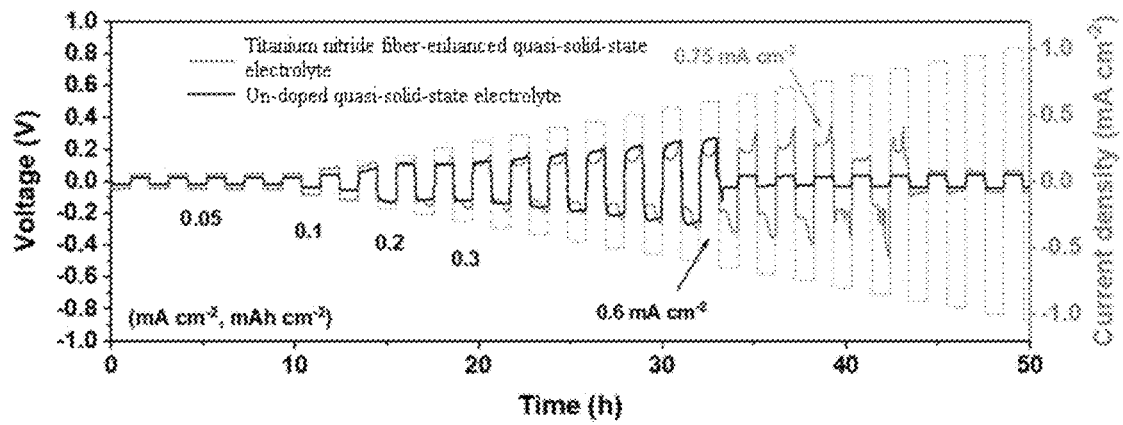

FIG. 6 shows a critical current density of a lithium symmetrical battery respectively assembled with the un-doped PVDF-HFP-based QPE prepared in the control embodiment 1 and the TiN nanofiber-enhanced QPE prepared in embodiment 1 and embodiment 2.

Figure 7:
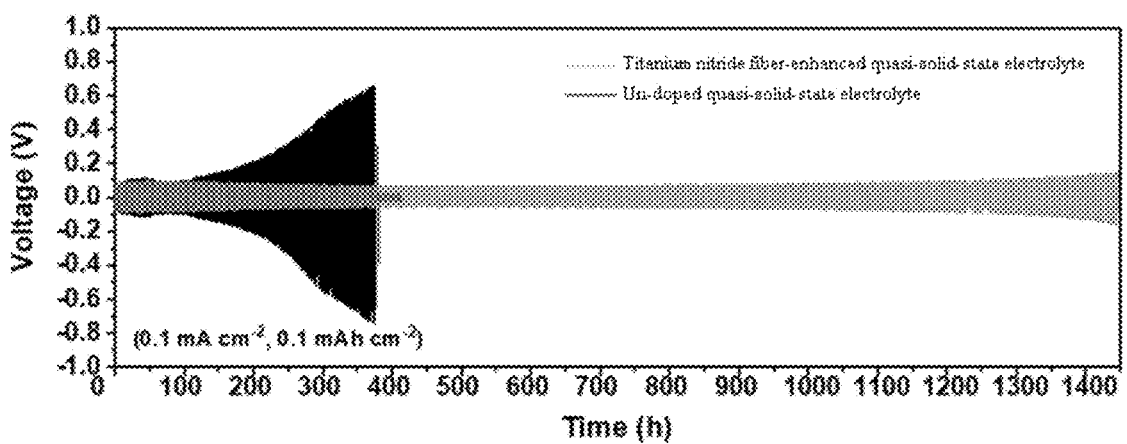

FIG. 7 shows the cycle life of a lithium symmetrical battery respectively assembled with the un-doped PVDF-HFP-based QPE prepared in the control embodiment 1 and the TiN nanofiber-enhanced QPE prepared in embodiment 1 and embodiment 2.

Figure 8:
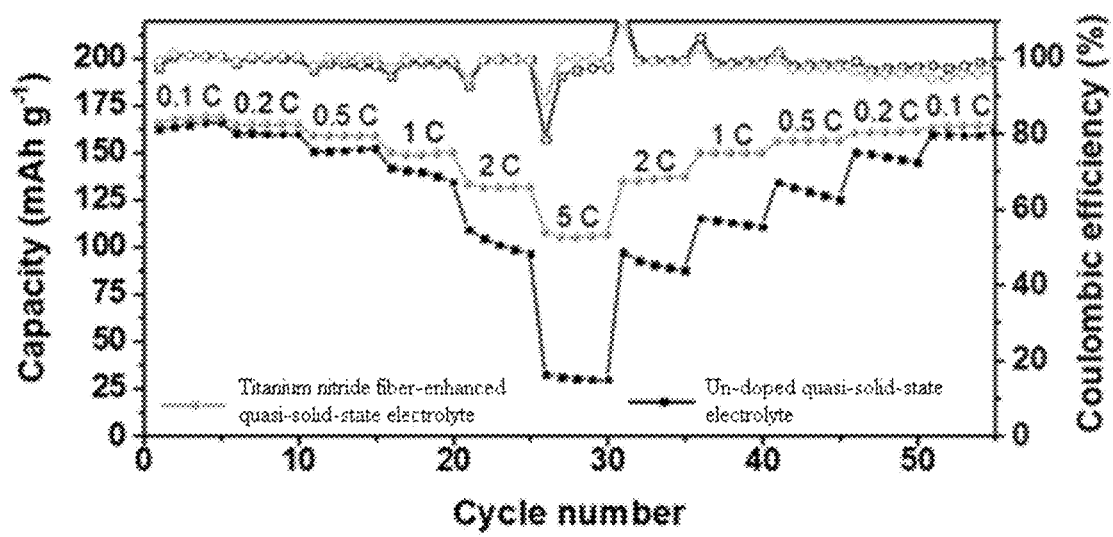

FIG. 8 is the rate performance curves of the Li||LiFePO$_4$ full cells respectively assembled with the un-doped PVDF-HFP-based QPE prepared in the control embodiment 1 and the TiN nanofiber-enhanced QPE prepared in embodiment 1 and embodiment 3.

Figure 9:
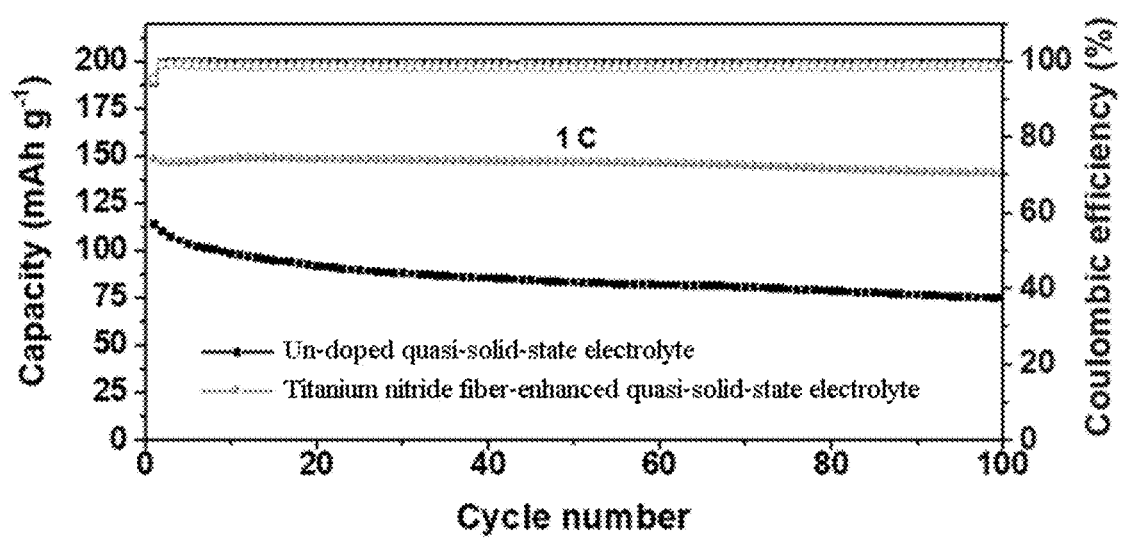

FIG. 9 is the cycle performance curves of the Li||LiFePO$_4$ full cells assembled with the un-doped PVDF-HFP-based QPE prepared in the control embodiment 1 and the TiN nanofiber-enhanced QPE prepared in embodiment 1 and embodiment 3.

DETAILED DESCRIPTIONS OF EMBODIMENTS

Specific implementation 1: the preparation method of the TiN nanofiber-enhanced QPE in the implementation is carried out by the following steps:

I. Preparation of TiN Nanofiber:
① Adding, stirring, and dissolving polyvinylpyrrolidone in a mixed solution of anhydrous ethanol and glacial acetic acid, and then adding tetrabutyl titanate and continuing stirring to form a uniform solution as the electrospinning precursor solution;
② Loading the electrospinning precursor solution into a syringe and then mounting the syringe inside an electrospinning machine. Finally, the fiber felt was obtained in a high voltage environment;
③ Heating the fiber felt to a calcination temperature in an air atmosphere and then calcining at the calcination temperature to obtain TiO$_2$ nanofiber;
④ Placing the TiO$_2$ nanofiber into a tube furnace and then introducing a mixed gas of NH$_3$ and Ar into the tube furnace. Heating the tube furnace to the calcination temperature to obtain TiN nanofiber;

II. Preparation of Electrolyte
① Adding the TiN nanofiber to N, N-dimethylformamide for ultrasonic treatment. Then, add PVDF-HFP and LiTFSI and magnetically stir to obtain a casting solution;
② Performing vacuum defoaming on the casting solution and then casting the solution on a glass plate with a doctor blade, and finally drying to obtain the TiN nanofiber-enhanced QPE.

Specific implementation 2: this implementation differs from specific implementation 1 in that: in step I ①, the volume ratio of anhydrous ethanol to glacial acetic acid in the mixed solution of anhydrous ethanol and glacial acetic acid in step I ① is 7:3. Other steps are identical to those of the specific implementation 1.

Specific implementation 3: this implementation differs from specific implementations 1 and 2 in that: in step I ①, the ratio of the mass of polyvinylpyrrolidone to the volume of the mixed solution of anhydrous ethanol and glacial acetic acid is (1-2 g):10 mL; in the step I ①, the volume ratio of tetrabutyl titanate to the mixed solution of anhydrous ethanol and glacial acetic acid is (2-4 mL): 10 mL. Other steps are identical to those of the specific implementation 1 or 2.

Specific implementation 4: this implementation differs from one of the specific implementations 1 to 3 in that: in step I ②, the electrospinning uses a No. 22 needle, the liquid supply rate is 1-2 mL h$^{-1}$, the voltage is 15-30 kV, and the distance between the needle and an electrode plate is 15-20 cm. Other steps are identical to those of the specific implementations 1 to 3.

Specific implementation 5: this implementation differs from one of the specific implementations 1 to 4 in that: in step I ③, the rate of the heating is 1° C. min$^{-1}$ to 3° C. min$^{-1}$; and in step I ③, the calcination temperature is 500-550° C.; and the time of the calcination is 2-4 h. Other steps are identical to those of the specific implementations 1 to 4.

Specific implementation 6: this implementation differs from one of the specific implementations 1 to 5 in that: in step I ④, the volume ratio of $NH_3$ to Ar in the mixed gas is 1:1, and the flow rate of $NH_3$ is 80-100 sccm; in the step I ④, the rate of the heating is 5-10° C. $min^{-1}$; in the step I ④, the calcination temperature is 900-1000° C.; and in the step I ④, the time of the calcination is 1.5-3 h. Other steps are identical to those of the specific implementations 1 to 5.

Specific implementation 7: this implementation differs from one of the specific implementations 1 to 6 in that: in step II ①, the mass ratio of the TiN nanofiber to PVDF-HFP to LiTFSI is (1 to 5): (50 to 75): (20 to 45). Other steps are identical to those of the specific implementations 1 to 6.

Specific implementation 8: this implementation differs from one of the specific implementations 1 to 7 in that: in step II ①, the mass fraction of the TiN nanofiber in the casting solution is 0.2% to 1%; in step II ①, the time of the ultrasonic treatment is 20-40 min; in the step II ①, the temperature of the magnetic stirring is 40-60° C. and the time of the magnetic stirring is 6-12 h. Other steps are identical to those of the specific implementations 1 to 7.

Specific implementation 9: this implementation differs from one of the specific implementations 1 to 8 in that: in step II ②, the TiN nanofiber-enhanced QPE has a thickness of 50-100 m; in step II ②, the time of the vacuum defoaming is 10-30 min; in the step II ②, the temperature of the drying is 40-60° C. and the time of the drying is 12-24 h. Other steps are identical to those of the specific implementations 1 to 8.

Specific implementation 10: in this implementation, the TiN nanofiber-enhanced QPE is used as a solid-state electrolyte of a lithium ion battery.

The beneficial effect of the present disclosure is verified by the following embodiment.

Embodiment 1: there is a preparation method for a TiN nanofiber-enhanced QPE, which is carried out by the following steps:

I. Preparation of TiN Nanofiber:
① Adding, stirring, and dissolving 2 g of polyvinylpyrrolidone to a mixed solution of 7 mL of anhydrous ethanol and 3 mL of glacial acetic acid. Then add 3.5 mL of tetrabutyl titanate and continue stirring to form a uniform solution as the electrospinning precursor solution;
② Loading the electrospinning precursor solution into a syringe and then mounting the syringe inside an electrospinning machine. Finally, the fiber felt was obtained in a high voltage environment;
Wherein in the step I ②, the electrospinning uses No. 22 needle, the liquid supply rate is 1.2 mL $h^{-1}$, the voltage is 24 kV, and the distance between the needle and an electrode plate is 15 cm;
③ Heating the fiber felt to 550° C. at a rate of 3° C. $min^{-1}$ in an air atmosphere and then calcined for 3 h at 550° C. to obtain $TiO_2$ nanofiber;
④ Placing the $TiO_2$ nanofiber into a tube furnace and then introducing a mixed gas of $NH_3$ and Ar into the tubular furnace. Heating the tube furnace at a rate of 5° C. $min^{-1}$ to 1000° C. and then calcining for 2 h at the 1000° C. to obtain TiN nanofiber;
wherein in the step I ④, the volume ratio of $NH_3$ to Ar in the mixed gas of $NH_3$ and Ar is 1:1, and the flow rate of $NH_3$ is 100 sccm;

II. Preparation of Electrolytes:
① Adding the TiN nanofiber to N, N-dimethylformamide for ultrasonic treatment for 20 min. Then add PVDF-HFP and LiTFSI to magnetically stir for 12 h at 60° C. to obtain a casting solution;
Wherein in step II ①, the mass ratio of the TiN nanofiber to PVDF-HFP to LiTFSI is 5:50:45;
In the step II ①, the mass fraction of the TiN nanofiber in the casting solution is 1%;
② Performing vacuum defoaming on the casting solution for 30 min and then casting the solution on a glass plate by a 500 m doctor blade, and finally drying for 12 h at the temperature of 50° C. to obtain the TiN nanofiber-enhanced QPE.

Control embodiment 1: there is provided a preparation method for an un-doped PVDF-HFP-based QPE, which is carried out by the following steps:
① Adding PVDF-HFP and LiTFSI to N, N-dimethylformamide for ultrasonic treatment for 20 min, and then magnetically stirring for 12 h at the temperature of 60° C. to obtain a casting solution;
Wherein in step ①, the mass ratio of PVDF-HFP to LiTFSI is 1:1;
In the step ①, the mass fraction of PVDF-HFP in the casting solution is 10%;
② Performing vacuum defoaming on the casting solution for 30 min and then casting the solution on a glass plate with a 500 m doctor blade, and finally drying for 12 h at the temperature of 50° C. to obtain the quasi-solid-state electrolyte.

Figure 1A:
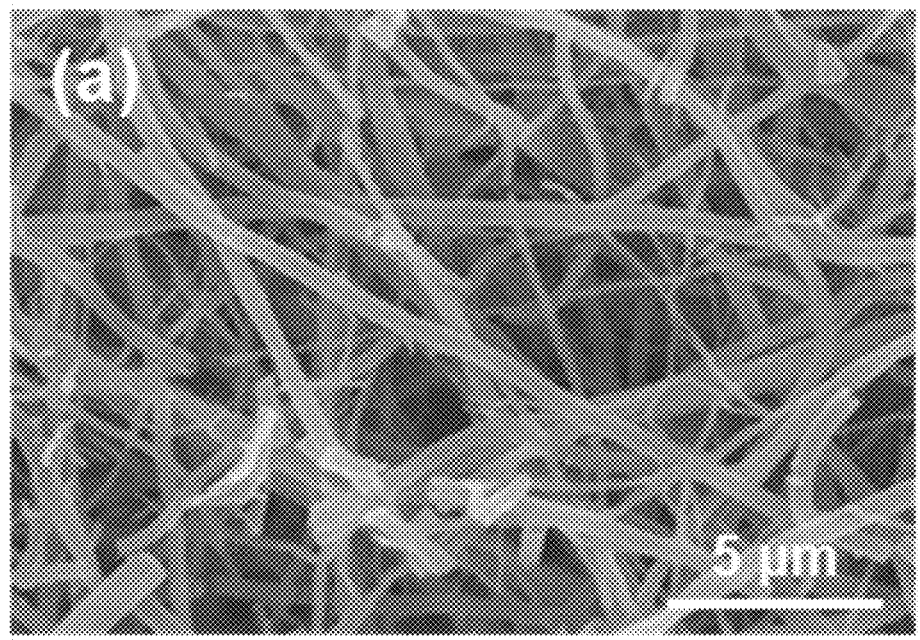
Figure 1B:
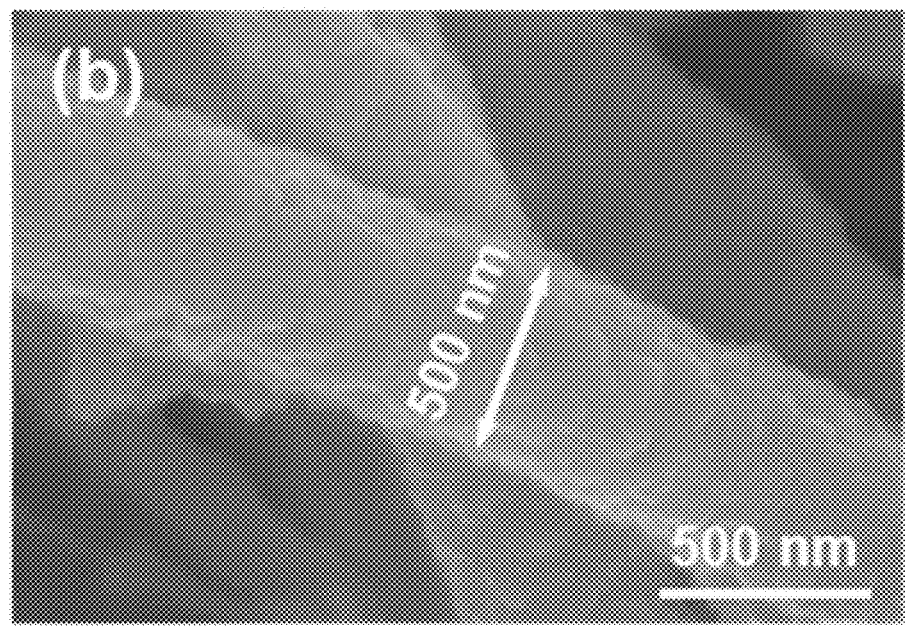
Figure 1C:
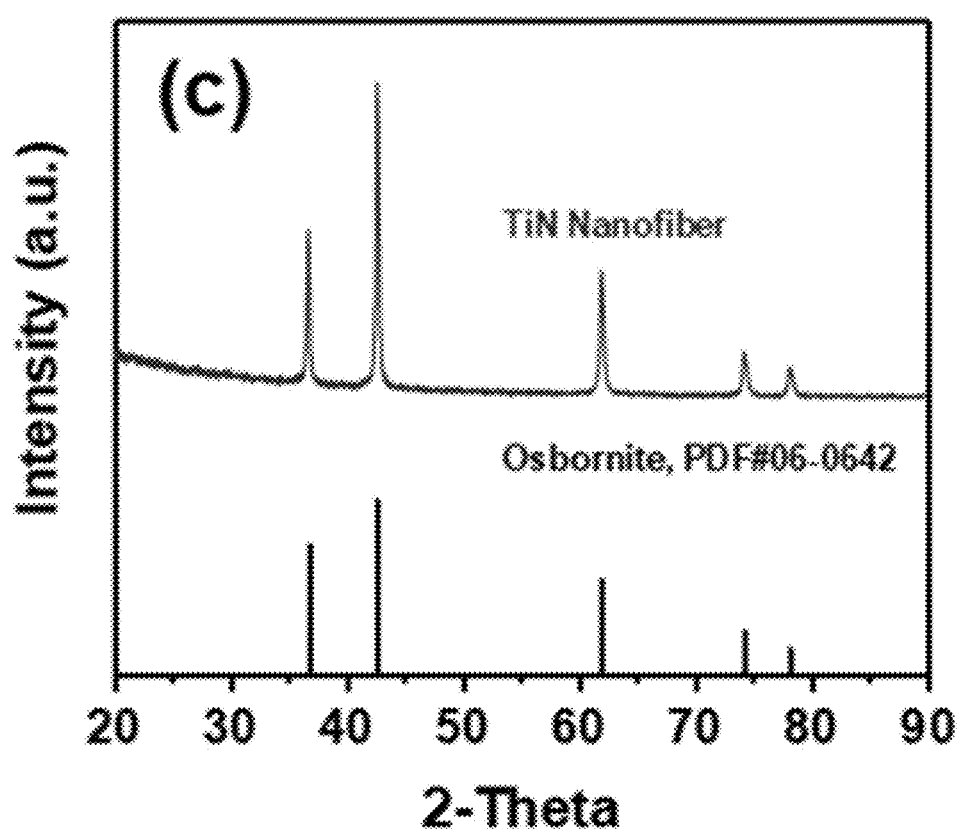

FIGS. 1A-C are SEM images and XRD pattern of TiN nanofiber prepared in embodiment 1 under different magnification factors, where FIGS. 1A-B are SEM images, and FIG. 1C is the XRD pattern.

The micro-morphology of the TiN nanofiber prepared in embodiment 1 is shown in FIGS. 1A-B. The magnification factors of the SEM image are 6 k and 60 k, respectively. It can be seen that the precursor fiber felt still maintains a fibrous structure with a diameter of about 500 nm after being calcined and nitrided. FIG. 1C is the XRD pattern of the TiN nanofiber, which has a sharp crystallization peak and fully corresponds to the TiN standard crystal card of PDF #06-0642, which means the synthetic material has a high crystallization degree.

Figure 2A:
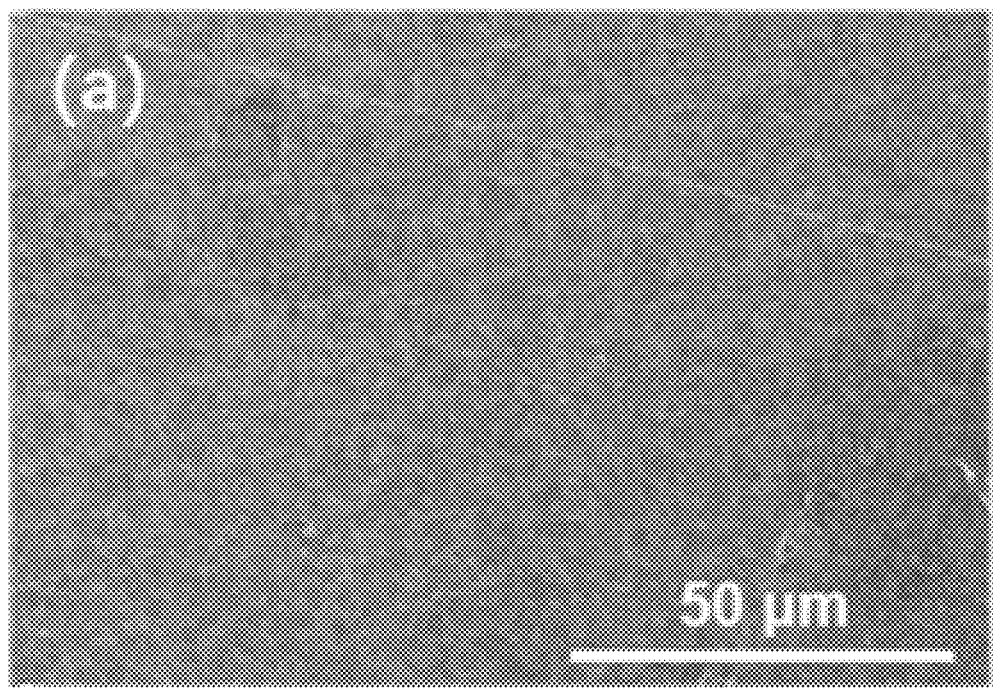
Figure 2B:
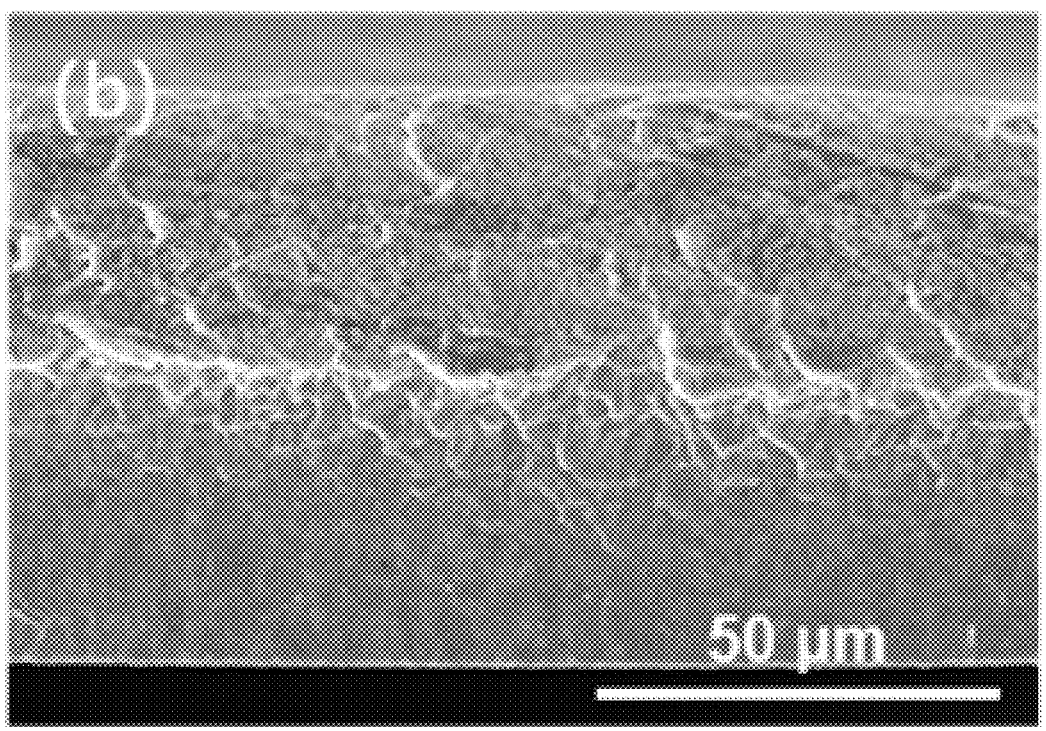
Figure 2C:
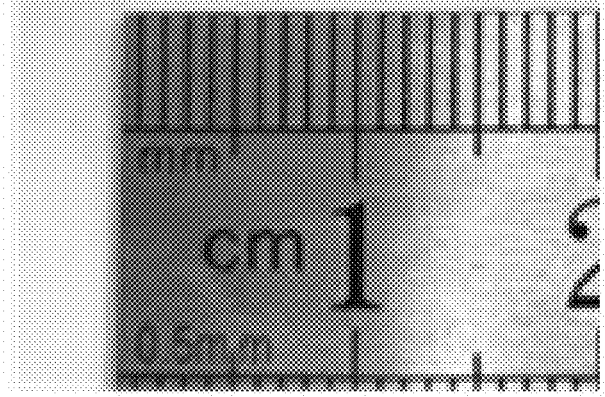
Figure 2D:
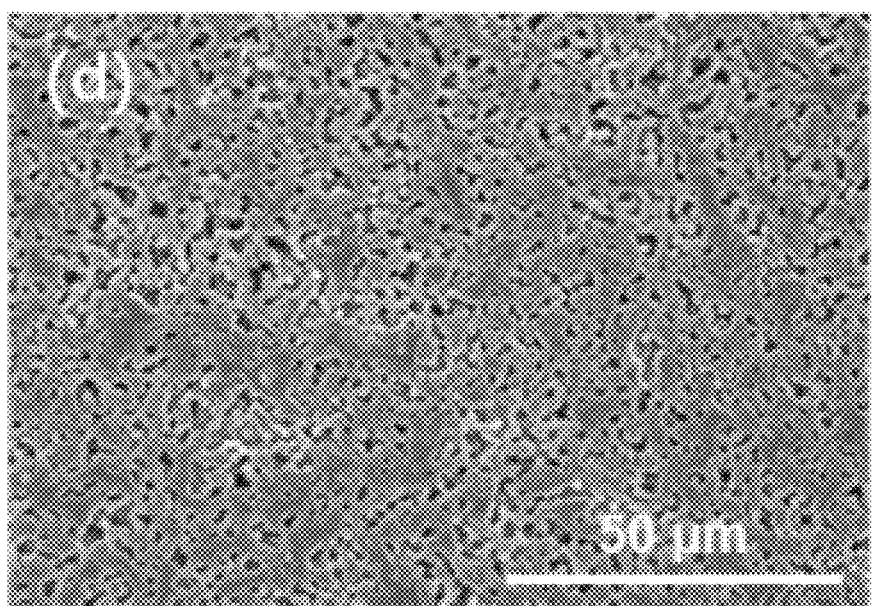
Figure 2E:
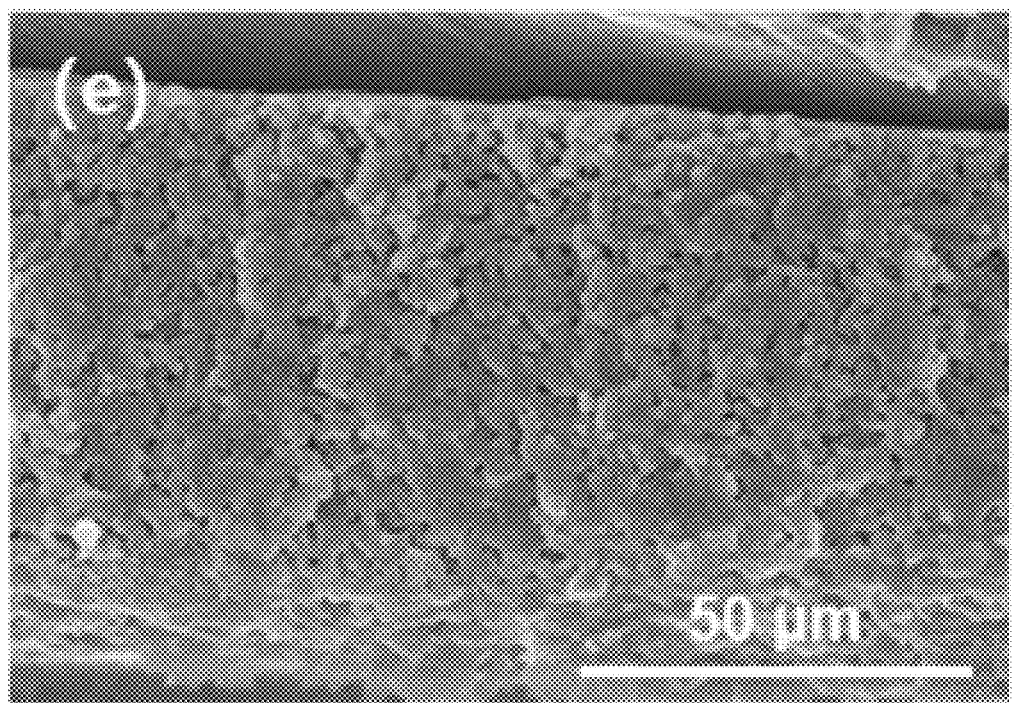
Figure 2F:
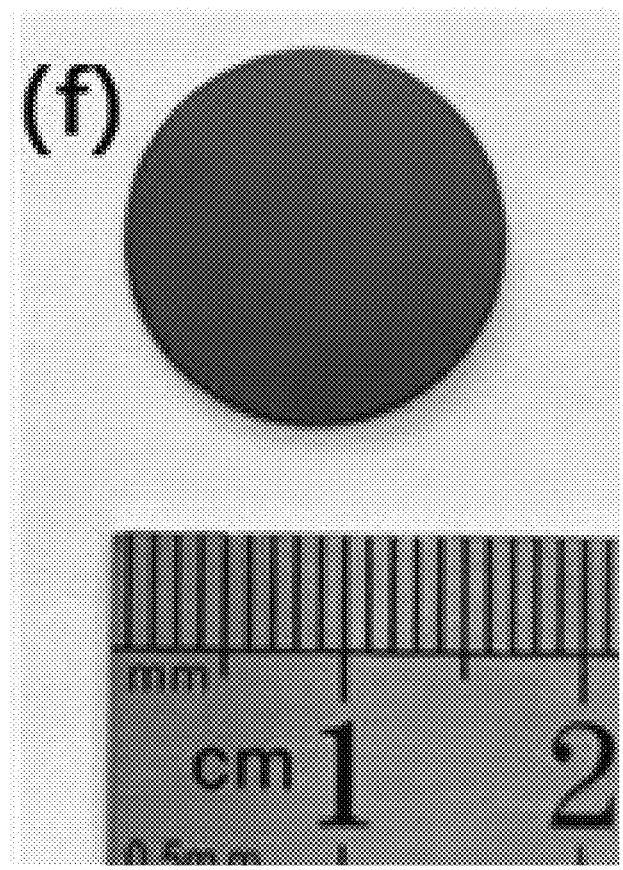

FIGS. 2A-F are surface SEM images, the cross-sectional SEM images, and the optical photographs of the un-doped PVDF-HFP-based QPE and the TiN nanofiber-enhanced QPE prepared in a control embodiment 1, where FIGS. 2A-C are the surface SEM image, cross-sectional SEM image, and an optical photograph of the un-doped PVDF-HFP-based QPE, respectively. And FIGS. 2D-F are the surface SEM image, sectional SEM image, and optical photograph of the TiN nanofiber-enhanced QPE, respectively.

FIGS. 2A and D show surface SEM images with a magnification factor of 1 k of the un-doped PVDF-HFP-based QPE and the TiN nanofiber-enhanced QPE prepared in embodiment 1, respectively. It can be seen that the electrolyte film has a flat surface with a small number of holes generated by solvent volatilization in the drying process. FIGS. 2B and E show sectional images of the electrolytes, wherein the films have a thickness of about 72 m and 65 m, and their internal structures are relatively compact and less in holes which is beneficial to the transport of lithium ions. FIGS. 2C and F show optical photographs of the un-doped PVDF-HFP-based QPE and the TiN nanofiber-enhanced QPE prepared in embodiment 1. Wherein the un-doped PVDF-HFP-based QPE is light white and relatively transparent. Whereas, the TiN nanofiber-enhanced QPE is a black film with a flat surface and uniform color, which means the TiN nanofiber is uniformly dispersed in the polymer substrate.

Figure 3:
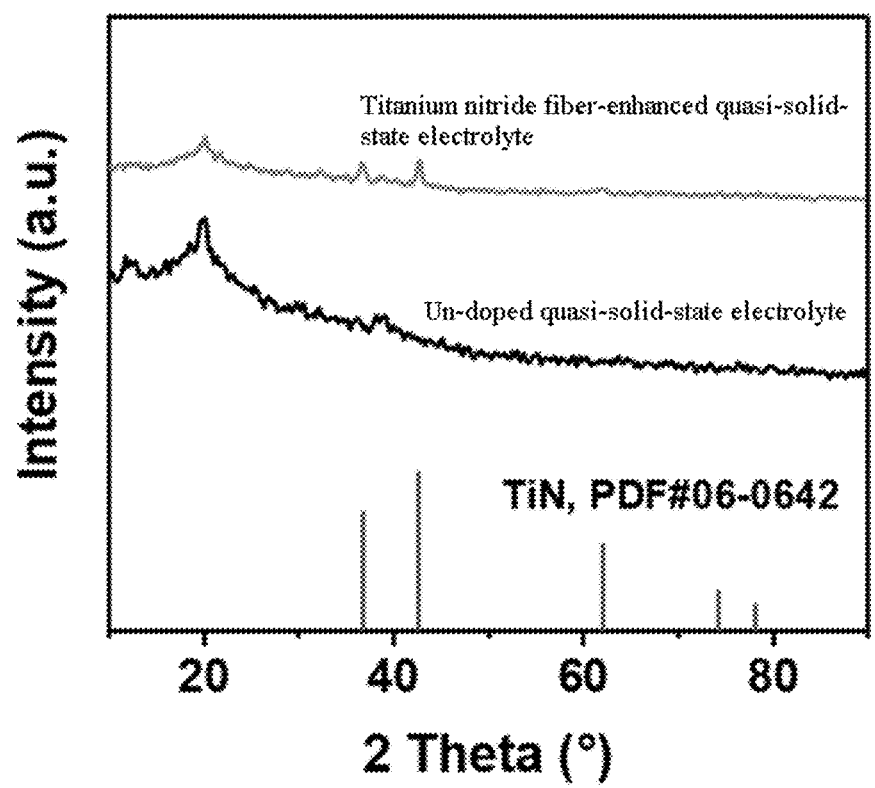
FIG. 3 is an XRD pattern of the un-doped PVDF-HFP-based QPE and the TiN nanofiber-enhanced QPE prepared in embodiment 1.

FIG. 3 is an XRD pattern of the un-doped PVDF-HFP-based QPE and the TiN nanofiber-enhanced QPE prepared in embodiment 1.

It can be seen from FIG. 3 that the un-doped polymer electrolyte has a sharp crystallization peak with high intensity around the position where 2θ is 20°, which means the polymer has a high degree of crystallization; the crystallization characteristics peak of PVDF-HFP doped with TiN nanofiber becomes wider with lower intensity, which means the crystallization behavior of the polymer is weakened, promoting the quick transport of the lithium ions in the electrolyte. Further, it can be seen that the position corresponding to the TiN crystallization card PDF #06-0642 has a corresponding peak, which means the TiN nanofiber is doped in the electrolyte film.

Figure 4:
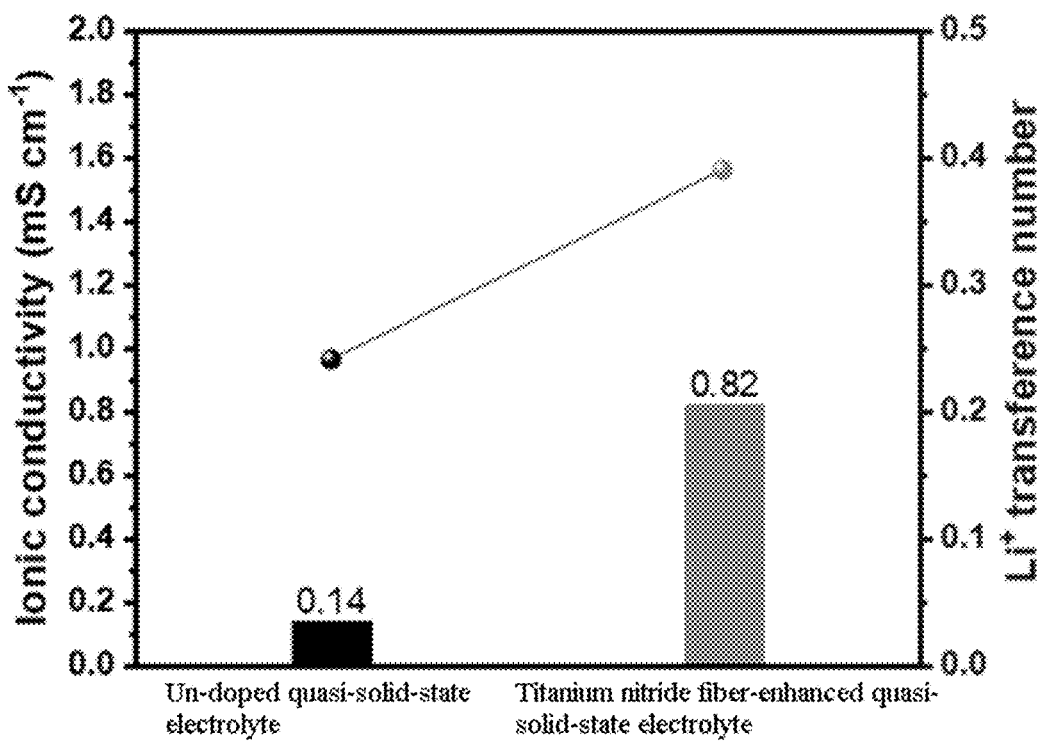
FIG. 4 shows an ionic conductivity and a lithium ion transference number of the un-doped PVDF-HFP-based QPE and the TiN nanofiber-enhanced QPE prepared in embodiment 1.

FIG. 4 shows the ionic conductivity and lithium ion transference number of the un-doped PVDF-HFP-based QPE and the TiN nanofiber-enhanced QPE prepared in embodiment 1.

It can be seen from FIG. 4 that after doping with the TiN nanofiber, the ionic conductivity of the QPE is significantly increased: the ionic conductivity before and after doping is 0.14 mS cm$^{-1}$ and 0.82 mS cm$^{-1}$, respectively. The Li$^+$ transference number is also increased from 0.24 to 0.39, which means that the doping of the TiN nanofiber can significantly improve the electrochemical performance of the QPE.

Figure 5:
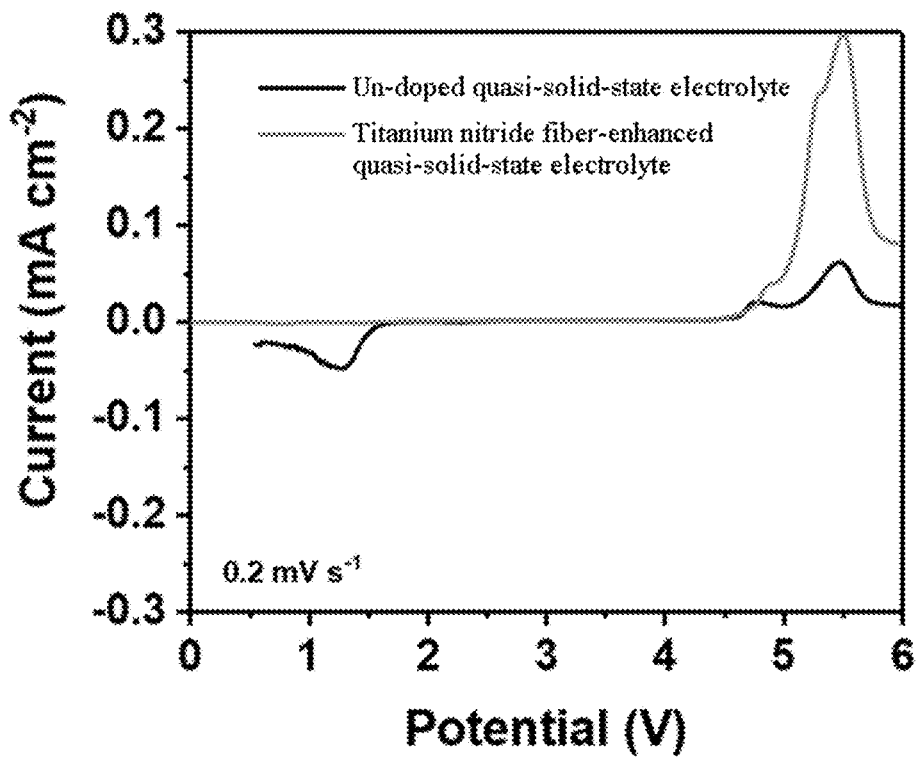
FIG. 5 shows an electrochemical stability window of the un-doped PVDF-HFP-based QPE and the TiN nanofiber-enhanced QPE prepared in embodiment 1.

Linear sweep voltammetry test is performed on the electrochemical stability windows of the un-doped PVDF-HFP-based QPE and the TiN nanofiber-enhanced QPE prepared in embodiment 1, as shown in FIG. 5.

FIG. 5 shows an electrochemical stability window of the un-doped PVDF-HFP-based QPE and the TiN nanofiber-enhanced QPE prepared in embodiment 1.

It can be seen from FIG. 5 that the oxidation potential of the electrolyte before and after doping does not change obviously, and is about 4.7 V, which can satisfy the working requirements of the cathode material of the lithium battery; but the doping significantly improves a reduction resistance of the quasi-solid-state electrolyte. The reduction potential of the electrolyte before doping is about 1.54 V, while the electrolyte doped with TiN nanofiber has no obvious reduction peak above 0 V, which means the reduction resistance is significantly increased.

Embodiment 2: the lithium symmetrical battery assembled with the TiN nanofiber-enhanced QPE prepared in embodiment 1 is completed in the following steps:

A spring and a spacer sheet are placed in a CR2032 type coin cell anode shell, and then a Li metal is put inside, and then 2 μL of liquid electrolyte is dropwise added to improve an interface contact; then, the TiN nanofiber-enhanced QPE is put inside and 2 μL of liquid electrolyte is dropwise added again; then another Li metal is put inside while ensuring the Li metal at both sides of the electrolyte are centralized; finally, a cathode shell is covered and then sealed by a coin cell sealing machine to obtain the lithium symmetrical battery.

The liquid electrolyte is obtained by dissolving LiPF$_6$ in a mixed solvent of EC, DEC, and EMC, wherein the volume ratio of EC to DEC to EMC is 1:1:1, and the concentration of LiPF$_6$ in the electrolyte is 1 mol L$^{-1}$.

Based on the above method, the lithium symmetrical battery is assembled with the un-doped PVDF-HFP-based QPE prepared in the control embodiment 1.

FIG. 6 shows an extreme current density of a lithium symmetrical battery respectively assembled with the un-doped PVDF-HFP-based QPE prepared in the control embodiment 1 and the TiN nanofiber-enhanced QPE prepared in embodiment 1 and embodiment 2.

It can be seen from FIG. 6 that the critical current density of the un-doped PVDF-HFP-based QPE is 0.6 mA cm$^{-2}$, and after doping with TiN nanofiber, the critical current density is increased to 0.75 mA cm$^{-2}$, indicating a higher inhibition effect on the lithium dendrite.

Under the current density of 0.1 mA cm$^{-2}$ and the areal capacity of 0.1 mAh cm$^{-2}$, the test is performed on the service life of the lithium symmetrical battery assembled with the un-doped PVDF-HFP-based QPE prepared in the control embodiment 1 and the TiN nanofiber-enhanced QPE prepared in embodiment 1, as shown in FIG. 7.

FIG. 7 shows the service life of a lithium symmetrical battery assembled with the un-doped PVDF-HFP-based QPE prepared in control embodiment 1 and the TiN nanofiber-enhanced QPE prepared in embodiment 1 and embodiment 2, respectively.

It can be seen from FIG. 7 that the lithium symmetrical battery assembled with the un-doped PVDF-HFP-based QPE after cycles about 100 h, the overpotential expands quickly, which means the interface is degraded and hence causes a quick increase of impedance; after about 370 h, short-circuiting occurs to the symmetrical battery; after the TiN nanofiber is doped, the life of the quasi-solid-state electrolyte is significantly improved; while the lithium symmetrical battery assembled with the TiN nanofiber-enhanced QPE prepared in embodiment 1 has a lower overpotential and can run stably more than 1400 h, increasing its life to more than four times.

Embodiment 3: the Li|QPE|LiFePO$_4$ full cells assembled with the TiN nanofiber-enhanced QPE prepared in embodiment 1 are completed in the following steps:

A spring and a spacer sheet are placed in a CR2032 type coin cell anode shell, and then a Li metal is put inside, and then 2 μL of liquid electrolyte is dropwise added; then, the TiN nanofiber-enhanced QPE is put inside and 2 μL of liquid electrolyte is dropwise added again; then a cathode is put inside while ensuring the cathode and lithium at both sides of the electrolyte are centralized; finally, a cathode shell is covered and then sealed by a coin cell sealing machine to obtain the Li|QPE|LiFePO$_4$ full cells.

The liquid electrolyte is obtained by dissolving LiPF$_6$ in a mixed solvent of EC, DEC, and EMC, wherein the volume ratio of EC to DEC to EMC is 1:1:1, and the concentration of LiPF$_6$ in the electrolyte is 1 mol L$^{-1}$.

Based on the above method, the Li|PVDF-HFP|LiFePO$_4$ full cells are assembled with the un-doped PVDF-HFP-based QPE prepared in the control embodiment 1.

FIG. 8 is a rate performance curve of the Li||LiFePO$_4$ full cells respectively assembled with the un-doped PVDF-HFP-based QPE prepared in the control embodiment 1 and the TiN nanofiber-enhanced QPE prepared in embodiment 1 and embodiment 3.

It can be seen from FIG. 8 that the Li||LiFePO$_4$ full cell assembled with the un-doped PVDF-HFP-based QPE prepared in the control embodiment 1 has a specific discharge capacity of 162 mAh g$^{-1}$ under the 0.1 C, and along with the increase of the charge and discharge rate, its discharge capacity quickly diminishes; when the rate is increased to 2 C and 5 C, the specific discharge capacity is only 101 mAh $g^{-1}$ and 32 mAh $g^{-1}$. After modification is performed with the TiN nanofiber, the Li‖LiFePO$_4$ full cell assembled with the TiN nanofiber-enhanced QPE prepared in embodiment 1 and embodiment 3 shows a high specific discharge capacity of 164 mAh $g^{-1}$ at 0.1 C, and still has a specific capacity of 131 mAh $g^{-1}$ and 105 mAh $g^{-1}$ even when the rate is increased to 2 C and 5 C, which proves that the TiN nanofiber-enhanced QPE has excellent rate performance and realize quick charge and discharge.

FIG. 9 is a cycle performance curves of the Li‖LiFePO$_4$ full cell assembled with the un-doped PVDF-HFP-based QPE prepared in the control embodiment 1 and the TiN nanofiber-enhanced QPE prepared in embodiment 1 and embodiment 3.

FIG. 9 shows the cycle performances of the two full cells at 1 C. The Li‖LiFePO$_4$ full cell assembled with the un-doped PVDF-HFP-based QPE prepared in the control embodiment 1 has an initial specific discharge capacity of about 114 mA h $g^{-1}$, and after completing 100 cycles, the specific discharge capacity is decreased to 75 mAh $g^{-1}$, with a capacity retention rate of 65.8%. While the performance of the cell using the TiN nanofiber-enhanced QPE has a significantly increase. The Li‖LiFePO$_4$ full cell assembled with the TiN nanofiber-enhanced QPE prepared in the control embodiment 1 and embodiment 3 has an initial specific discharge capacity of 148 mAh $g^{-1}$ at 1 C. After completing 100 cycles, still has a capacity of 141 mAh $g^{-1}$ with a capacity retention rate of more than 95%, which proves that after the modification of TiN nanofiber, the electrochemical performances of the quasi-solid-state electrolyte are effectively increased.

What is claimed is:

1. A preparation method of a titanium nitride fiber-enhanced quasi-solid-state electrolyte, comprising the following steps:

I. preparation of TiN nanofiber:
① adding polyvinylpyrrolidone to a mixed solution of anhydrous ethanol and glacial acetic acid and magnetically stirring to dissolution of polyvinylpyrrolidone, and then adding tetrabutyl titanate and continuing stirring to form a uniform solution, so as to obtain an electrospinning precursor solution;
wherein in the step I ①, a volume ratio of anhydrous ethanol to glacial acetic acid in the mixed solution of anhydrous ethanol and glacial acetic acid in the step I M is 7:3;
in the step I ①, a ratio of a mass of polyvinylpyrrolidone to a volume of the mixed solution of anhydrous ethanol and glacial acetic acid is (1 g to 2 g):10 mL;
in the step I M, a volume ratio of tetrabutyl titanate to the mixed solution of anhydrous ethanol and glacial acetic acid is (2 mL to 4 mL): 10 mL,
② loading the electrospinning precursor solution into a syringe and then mounting the syringe inside an electrospinning machine, and then performing electrospinning to obtain a fiber felt;
wherein in the step I ②, the electrospinning uses No. 22 needle, a liquid supply rate is 1 mLh−1 to 2 mLh−1, a voltage is 15 kV to 30 kV, and a distance between the needle and an electrode olate is 15 cm to 20 cm;
③ heating the fiber felt to a calcination temperature in an air atmosphere and then calcining at the calcination temperature to obtain TiO$_2$ nanofiber;
wherein in the step I ③, a rate of the heating is 1° C. min−1 to 3° C. min−1; and
in the step I ③, the calcination temperature is 500° C. to 550° C.; and a time of the calcination is 2 h to 4 h;
④ placing the TiO$_2$ nanofiber into a tubular furnace and then introducing a mixed gas of NH$_3$ and Ar into the tubular furnace, and heating the tubular furnace to the calcination temperature and then calcining at the calcination temperature to obtain TiN nanofiber;
wherein in the step I ④, a volume ratio of NH3 to Ar in the mixed gas of NH3 and Ar is 1:1, and a flow rate of NH3 is 80 sccm to 100 sccm;
in the step I ④, a rate of the heating is 50° C. min−1 to 10° C. min−1;
in the step I ④, the calcination temperature is 900° C. to 1000° C.; and
in the step I ④, a time of the calcination is 1.5 h to 3 h;

II. preparation of electrolyte:
① adding the TiN nanofiber to N,N-dimethylformamide for ultrasonic treatment and then adding PVDF-HFP and LiTFSI and magnetically stirring to obtain a casting solution;
wherein in the step II ①, a mass ratio of the TiN nanofiber to PVDF-HFP to LiTFSI is (1 to 5):(50 to 75):(20 to 45);
in the step II ①, a mass fraction of the TiN nanofiber in the casting solution is 0.2% to 1%;
② performing vacuum defoaming on the casting solution and then casting the casting solution on a glass plate, and then scraping into a film by using a scraper, and finally drying to obtain the titanium nitride fiber-enhanced quasi-solid-state electrolyte.

2. The preparation method of claim 1, wherein in the step II ①, a time of the ultrasonic treatment is 20 min to 40 min: in the step II ①, a temperature of the magnetic stirring is 40° C. to 60° C. and a time of the magnetic stirring is 6 h to 12 h.

3. The preparation method of claim 1, wherein in the step II ②, the titanium nitride fiber-enhanced quasi-solid-state electrolyte has a thickness of 50 µm to 100 µm: in the step II ②, a time of the vacuum defoaming is 10 min to 30 min: in the step II ②, a temperature of the drying is 40° C. to 60° C. and a time of the drying is 12 h to 24 h.

4. An application of the titanium nitride fiber-enhanced quasi-solid-state electrolyte prepared using the preparation method of claim 1, wherein the titanium nitride fiber-enhanced quasi-solid-state electrolyte is used as a solid-state electrolyte of a lithium ion battery.

* * * * *